UNITED STATES PATENT OFFICE.

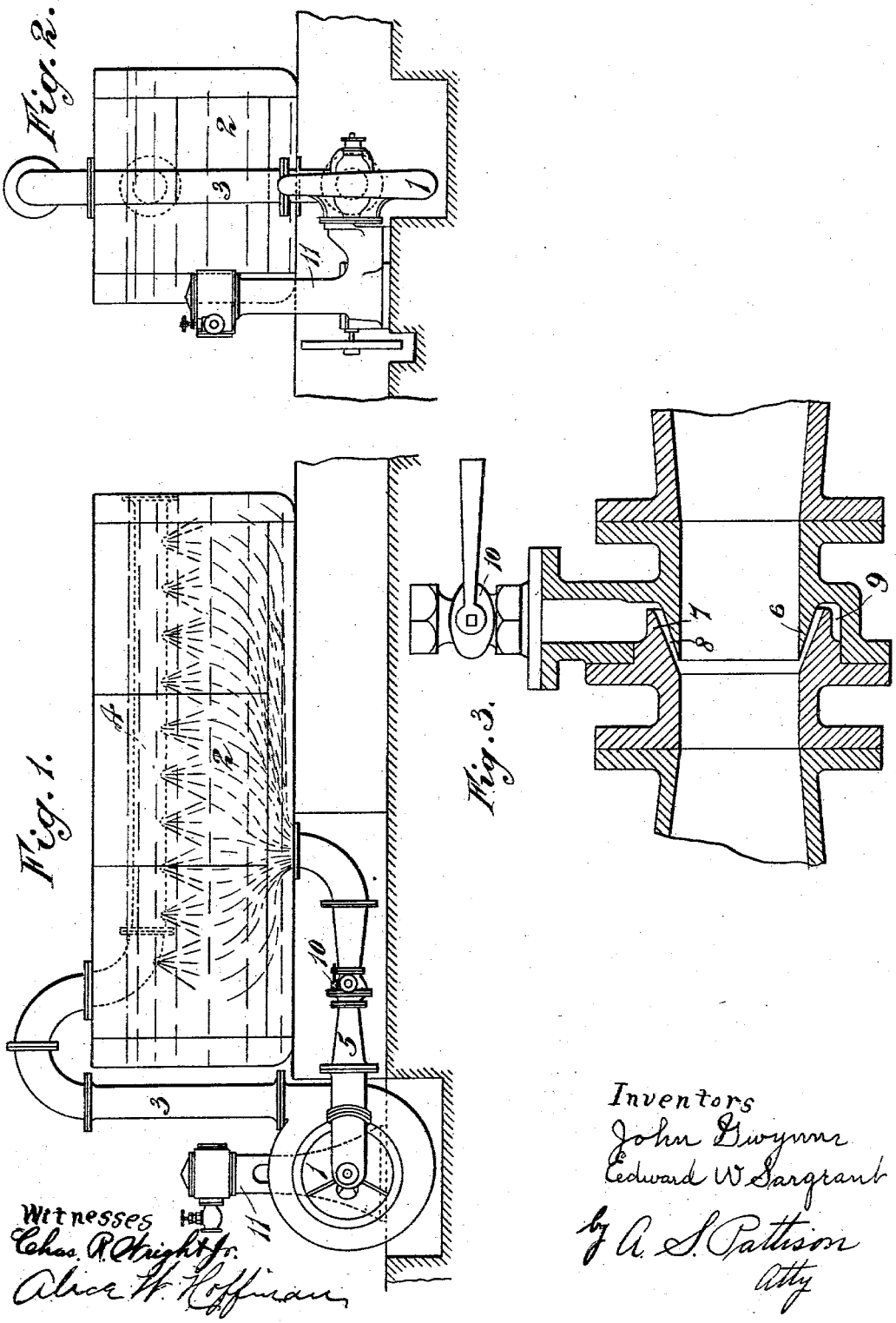

JOHN GWYNNE AND EDWARD WASHBOURN SARGEANT, OF HAMMERSMITH, ENGLAND.

APPARATUS FOR AERATING LIQUIDS.

SPECIFICATION forming part of Letters Patent No. 721,036, dated February 17, 1903.

Application filed November 19, 1901. Serial No. 82,945. (No model.)

*To all whom it may concern:*

Be it known that we, JOHN GWYNNE and EDWARD WASHBOURN SARGEANT, subjects of the King of Great Britain and Ireland, residing at Hammersmith, in the county of Middlesex, England, have invented Improvements in Means for Aerating Liquids, of which the following is a specification.

It is sometimes desirable to introduce air into liquids—for example, into chemical solutions, which in order that the proper reactions may take place require the presence of air—and this invention has reference to improvements in means for introducing air into liquid in such a manner that it shall become intermingled with and dispersed through the liquid to be aerated. For this purpose a centrifugal pump, which may have its suction-pipe connected to the bottom of a liquid-containing tank and its delivery-pipe to a perforated pipe arranged in the upper part of said tank, is provided with a device comprising a liquid-inlet nozzle, an air-inlet passage or space, and a combining-nozzle and adapted to have the liquid pumped through it by the pump, the construction of the device being such that air will be drawn into and caused to mingle with the liquid by the action of the said liquid passing through the device at a high velocity.

Referring to the accompanying illustrative drawings, Figures 1 and 2 are elevations at right angles to each other of apparatus according to this invention, and Fig. 3 is a sectional view of the device whereby air is admitted to the suction-pipe of the pumps.

1 is the centrifugal pump; 2, the liquid-containing tank; 3, the delivery-pipe of the pump; 4, the perforated pipe connected to or forming part of the said delivery-pipe and extending lengthwise of the tank 2 below the level of the liquid therein.

5 is the pump suction-pipe, which is connected to the bottom of the tank 2 and is fitted with the device illustrated in Fig. 3, the suction-pipe being contracted toward the said device on each side thereof, as shown in Fig. 1. This device comprises a nozzle 6, which is supplied with liquid from the tank 2 and extends into and is surrounded by a combining-nozzle 7, that leads to the inlet of the pump. The space 8 between the nozzles 6 and 7 communicates with an air-supply chamber 9, the inlet to which is controlled by a cock 10.

11 is the engine by which the pump is driven.

The operation is as follows: The tank 2 being charged with liquid and the cock 10 being closed, the pump is started and the liquid pumped from the tank 2 through the nozzles 6 and 7. When the pump has attained the required speed, the cock 10 is opened, whereupon the liquid flowing at a high velocity from the nozzle 6 to the nozzle 7 draws through the space 8 a supply of air, which mixes with the liquid passed through the pump and delivered into the tank through the perforated pipe 4, the result being that the liquid will become thoroughly aerated.

What we claim is—

1. In means for aerating liquids, the combination of a liquid-containing tank, a centrifugal pump the suction-pipe of which is connected to said tank, a device comprising a liquid-inlet nozzle and a surrounding combining-nozzle, said nozzles being separated by an intervening air-inlet passage in communication with the atmosphere, and a delivery-pipe adapted to discharge into said tank, as set forth.

2. In means for aerating liquids, the combination of a liquid-containing tank, a centrifugal pump, the suction-pipe of which is connected to said tank, a device comprising a liquid-inlet nozzle and a surrounding combining-nozzle, said nozzles being separated by an intervening air-inlet passage in communication with the atmosphere, and a perforated delivery-pipe adapted to discharge into said tank, as set forth.

3. In means for aerating liquids, the combination of a centrifugal pump, a liquid-containing tank, a perforated delivery-pipe arranged below the level of the liquid in said tank, a suction-pipe connected to the bottom of the tank and a device fitted in said suction-pipe and comprising a liquid-inlet nozzle and a surrounding combining-nozzle, said nozzles being separated by an intervening air-inlet passage communicating with the atmosphere through a cock, as set forth.

Signed at 77 Cornhill, London, England, this 4th day of November, 1901.

JOHN GWYNNE.
EDWARD WASHBOURN SARGEANT.

Witnesses:
PERCY E. MATTOCKS,
EDMUND S. SNEWIN.